(12) United States Patent
Hori et al.

(10) Patent No.: US 9,974,324 B2
(45) Date of Patent: May 22, 2018

(54) FOOD FOR MICROWAVE OVEN COOKING

(71) Applicant: AJINOMOTO WINDSOR, INC., Ontario (CA)

(72) Inventors: Kazuya Hori, Ontario (CA); Masashi Sekine, Portland, OR (US); Koichi Kunishima, Portland, OR (US)

(73) Assignee: AJINOMOTO WINDSOR, INC., Ontorio, CA (US)

( * ) Notice: Subject to any disclaimer, the term of this patent is extended or adjusted under 35 U.S.C. 154(b) by 0 days. days.

(21) Appl. No.: 15/052,050

(22) Filed: Feb. 24, 2016

(65) Prior Publication Data

US 2016/0242438 A1 Aug. 25, 2016

Related U.S. Application Data

(60) Provisional application No. 62/119,997, filed on Feb. 24, 2015.

(51) Int. Cl.
| | |
|---|---|
| *A21D 13/00* | (2017.01) |
| *A23L 5/10* | (2016.01) |
| *A23L 1/00* | (2006.01) |
| *A23L 1/16* | (2006.01) |
| *A21D 8/06* | (2006.01) |
| *A23L 7/109* | (2016.01) |
| *A23L 13/00* | (2016.01) |
| *A23L 15/10* | (2016.01) |
| *A21D 13/31* | (2017.01) |
| *A23P 20/10* | (2016.01) |
| *A23P 20/20* | (2016.01) |

(52) U.S. Cl.
CPC .................. *A23L 5/15* (2016.08); *A21D 8/06* (2013.01); *A21D 13/31* (2017.01); *A23L 1/0067* (2013.01); *A23L 1/1606* (2013.01); *A23L 7/109* (2016.08); *A23L 7/11* (2016.08); *A23L 13/03* (2016.08); *A23L 15/10* (2016.08); *A23P 20/105* (2016.08); *A23P 20/20* (2016.08); *A23V 2002/00* (2013.01)

(58) Field of Classification Search
CPC ......... A21D 13/0022; A21D 8/06; A23L 7/11; A23L 13/03; A23L 5/11; A23P 20/00
See application file for complete search history.

(56) References Cited

U.S. PATENT DOCUMENTS

| | | | | |
|---|---|---|---|---|
| 6,139,894 | A * | 10/2000 | Hoshino | A21D 10/00 426/275 |
| 6,824,799 | B1 * | 11/2004 | Huang | A21D 2/181 426/100 |
| 2003/0203076 | A1 * | 10/2003 | Watanabe | A21D 8/06 426/94 |
| 2006/0263489 | A1 * | 11/2006 | Kunishima | A21D 6/001 426/100 |

* cited by examiner

*Primary Examiner* — Katherine D Leblanc
(74) *Attorney, Agent, or Firm* — Oblon, McClelland, Maier & Neustadt, L.L.P.

(57) ABSTRACT

By interposing a batter containing trehalose between a microwave-absorbing heat generator which generates heat with microwave energy and a noodle-strip food, a crisp texture and a freshly pan-fried flavor and aroma can be exhibited by the batter upon microwave cooking.

20 Claims, No Drawings

FOOD FOR MICROWAVE OVEN COOKING

CROSS REFERENCES TO RELATED APPLICATIONS

This application claims priority to U.S. Provisional Patent Application No. 62/119,997, filed on Feb. 24, 2015, which is incorporated herein by reference in its entirety.

BACKGROUND OF THE INVENTION

Field of the Invention

The present invention relates to foods for microwave oven cooking, which are suitable for imparting a crisp texture and a freshly pan-fried flavor and aroma to a heat-treated surface of a noodle-strip food, such as a gyoza dumpling.

Discussion of the Background

In noodle-strip foods, such as a gyoza dumpling, a savory freshly pan-fried flavor and aroma immediately after cooking and a freshly-baked crisp texture of a heat-treated surface are important factors in determining the commercial value. The foods are generally manufactured on the assumption of storage after the manufacture for about one week as a chilled product, and for two to three months as a frozen product.

However, in a noodle-strip food, including a noodle-strip portion with a small water content and a filling portion with a large water content, in particular, in a baked gyoza dumpling and the like, water transfers from the filling to the baked dough, and it is difficult to reproduce the crisp texture by microwave oven cooking. In addition, since the freshly pan-fried flavor and aroma is scattered during the storage, it has been very difficult to maintain the freshly pan-fried flavor and aroma throughout the distribution and storage. For solving the problems, various attempts have been made in the past.

For example, there is method to keep a preferable texture peculiar to the baked gyoza dumpling by applying before storage an edible oil on a surface of a gyoza dumpling containing a single- or multi-layer dough previously subjected to a baking-cooking (see, for example, JP-A-10-271978, which is incorporated herein by reference in its entirety). In this method however, although water transfer from the surface of the gyoza dumpling is prevented by the edible oil applied, there has been a problem in that the water transfer from the filling cannot be fully prevented, and that the texture is deteriorated when the food is cooked with a microwave oven.

As a method for providing a baked gyoza dumpling which can be readily cooked in a large number, and which gives a uniform browned color of the baked surface, a freshly-baked-like texture, and a savory flavor after cooking, a method for manufacturing a gyoza dumpling in which an emulsion of water, an oil or fat, and an emulsifier, containing a grain flour and/or a protein is applied on a bottom surface of a gyoza dumpling, followed by baking the gyoza dumpling, whereby the texture, appearance, and flavor are improved has been proposed (see, for example, JP-A-06-245740, which is incorporated herein by reference in its entirety). In this method however, although both the texture and the flavor are good immediately after baking, there has been a problem in that, when the gyoza dumpling is cooked with a microwave oven after freezer storage, the texture is worsened due to water transfer from the filling, and the freshly pan-fried flavor and aroma is also deteriorated.

Furthermore, a method for browning a food and imparting a crisp texture to the food even in microwave oven cooking by using a microwave-absorbing heat generator has also been studied.

For example, JP-A-2006-055026, which is incorporated herein by reference in its entirety, discloses a method for allowing a food to exhibit a crisp texture and a freshly pan-fried flavor and aroma by a batter or the like being heated or baked, the method comprising putting the batter or the like between a microwave-absorbing heat generator which generates heat with microwave energy and a noodle-strip food. In this method however, it has been required to use a microwave-absorbing heat generator sheet whose end portions are upwardly bent so that the batter or the like does not flow out of the microwave-absorbing heat generator sheet during heating.

There is known a method for manufacturing a crisp baked gyoza dumpling by applying a powder for baked gyoza dumpling including xylose and Joshinko (a rice flour) on a bottom surface of a gyoza dumpling, followed by baking the gyoza dumpling (see JP-A-2010-4797, which is incorporated herein by reference in its entirety). However, this method is a little cumbersome because the powder has to be applied on the bottom surface of the gyoza dumpling before cooking upon heat-cooking in a house or the like, and a simpler method has been demanded.

Thus, there remains a need for foods for microwave oven cooking, which are suitable for imparting a crisp texture and a freshly pan-fried flavor and aroma to a heat-treated surface of a noodle-strip food, such as a gyoza dumpling.

SUMMARY OF THE INVENTION

Accordingly, it is one object of the present invention to provide novel foods for microwave oven cooking.

It is another object of the present invention to provide novel foods for microwave oven cooking, which comprise a noodle-strip food, such as a gyoza dumpling, and exhibits a crisp texture and a freshly pan-fried flavor and aroma on a heat-treated surface of the noodle-strip food.

These and other objects, which will become apparent during the following detailed description, have been achieved by the inventors' discovery that, when a batter containing trehalose is present between a microwave-absorbing heat generator which generates heat with microwave energy and a noodle-strip food, a crisp texture and a freshly pan-fried flavor and aroma can be exhibited by the batter being heated and baked.

Specifically, the invention includes the following aspects.

A first aspect of the present invention is a food for microwave oven cooking, comprising a microwave-absorbing heat generator, a noodle-strip food, and a batter interposed between the microwave-absorbing heat generator and the noodle-strip food, wherein the batter contains trehalose.

A second aspect of the present invention is the food for microwave oven cooking according to the first aspect, wherein a content of trehalose in the batter is from 0.5% by weight to 25% by weight.

A third aspect of the present invention is the food for microwave oven cooking according to the first or second aspect, wherein a viscosity of the batter is from 0.07 Pa·s to 8 Pa·s.

A forth aspect of the present invention is the food for microwave oven cooking according to the third aspect, wherein the batter contains a grain flour and an emulsifier, and a content of the grain flour in the batter is from 5% by weight to 30% by weight.

A fifth aspect of the present invention is the food for microwave oven cooking according to the first aspect, wherein the food for microwave oven cooking is a frozen food.

A sixth aspect of the present invention is the food for microwave oven cooking according to the first aspect, wherein the noodle-strip food comprises, a dough, and a filling packed or wrapped in the dough.

A seventh aspect of the present invention is the food for microwave oven cooking according to the first aspect, wherein the noodle-strip food is one kind or two or more kinds selected from the group consisting of a gyoza dumpling, a shaomai, an egg roll, a ravioli, a Chinese steamed bun, a pie, a pierogi, a burrito, a taco, and a taquito.

An eighth aspect of the present invention is the food for microwave oven cooking according to the first aspect, wherein the noodle-strip food is a gyoza dumpling.

A ninth aspect of the present invention is a method for manufacturing a food for microwave oven cooking, comprising a step of placing a batter between a microwave-absorbing heat generator and a noodle-strip food, wherein the batter contains trehalose.

A tenth aspect of the present invention is a batter for a gyoza dumpling, comprising trehalose, a grain flour, and an emulsifier, wherein a content of trehalose is from 0.5% by weight to 25% by weight.

By using the food of the present invention, it is possible to provide a food which comprises a noodle-strip food and exhibits a crisp texture and a freshly pan-fried flavor and aroma on a heat-treated surface of the noodle-strip food by microwave oven cooking.

More specifically, the present invention provides foods for microwave oven cooking, comprising a batter interposed between a microwave-absorbing heat generator which generates heat by microwave energy and a noodle-strip food, wherein a good crisp texture and a freshly pan-fried flavor and aroma can be exhibited by the batter being heated and baked. In addition, the present invention provides a method for manufacturing a food for microwave oven cooking, comprising a step of placing a batter containing trehalose between a microwave-absorbing heat generator and a noodle-strip food.

DETAILED DESCRIPTION OF THE PREFERRED EMBODIMENTS

Food for microwave oven heating of the invention.

The present invention provides a food for microwave oven cooking (hereinafter, also referred to as the food of the present invention), comprising a microwave-absorbing heat generator, a noodle-strip food, and a batter interposed between the microwave-absorbing heat generator and the noodle-strip food, characterized in that the batter contains trehalose.

In the present invention, the noodle-strip food refers to a food in a state where a filling is packed or wrapped in a dough made mainly from a grain flour. The grain flour is not particularly limited, and wheat flour, rice flour, corn flour, barley flour, buckwheat flour, potato flour, soy flour, Azuki bean flour, Japanese millet flour, millet flour, Proso millet flour, and the like can be used. In the noodle-strip food, in addition to the grain flour, an oil or fat, salt, a saccharide, a starch, an emulsifier, a sweetener, an antioxidant, a colorant, a fragrance, and the like may be used as an auxiliary raw material. Specific examples of the noodle-strip food include a gyoza dumpling, a shaomai, an egg roll, ravioli, a lasagna, a Chinese steamed bun, a pie, a pierogi, a burrito, a taco, and a taquito. From the viewpoint of more easily exhibiting the effect of the invention, a gyoza dumpling is particularly preferred.

A gyoza dumpling according to the present invention is not particularly limited, and the term is used as meaning including a food obtained by wrapping a filling with a dough, followed by heating, the filling being obtained by combining pork minced meat, minced Chinese cabbage, leek, ginger, seasonings and the like, and the dough being obtained by kneading a grain flour such as wheat flour with water added and shaping the kneaded flour into a circle. Specific examples of the gyoza dumpling include a wild boar gyoza dumpling (pork gyoza dumpling), a chicken gyoza dumpling, a beef gyoza dumpling, a mutton gyoza dumpling, a fish gyoza dumpling, a shrimp gyoza dumpling, a sweet gyoza dumpling, a vegetable gyoza dumpling, and an Edamame (green soybean) gyoza dumpling.

The noodle-strip food of the present invention may be an unheated product, or may be a product obtained after a heat treatment such as steam-cooking, baking-cooking, and frying-cooking. The noodle-strip food also includes a product refrigerated or frozen after manufacture. The method for producing a noodle-strip food in the present invention is not particularly limited, and a method known per se can be used.

The microwave-absorbing heat generator in the present invention refers to a heat generator having a characteristic of absorbing a microwave energy and converting the energy to heat to generate heat. The microwave-absorbing heat generator includes a heat generator which itself is in a form of a sheet, a heat generator obtained by depositing aluminum as a heat generating material from vapor onto a paper material followed by shaping, a heat generator obtained by sticking a heat generator sheet on a heat resistant container, and the like. For foods, a heat generator in which a heat generating layer is made of a powder of a metal such as aluminum and the top of the heat generating layer is laminated with a resin such as PET so that the heat generating layer is not brought into direct contact with a food is suitably used. The heat resistance temperature of the resin is appropriately from 200° C. to 230° C., and the temperature of the heat generator is controlled so as not to reach that of the heat resistance temperature of the laminate material or higher. The shape of the microwave-absorbing heat generator is not particularly limited, and may be, for example, a sheet shape, a plate shape, a tray shape, and a foil shape. The microwave-absorbing heat generator is preferably of a shape that is easy to transfer heat to a surface to be heat-cooked of the noodle-strip food, and when the surface to be heat-cooked of the noodle-strip food is flat, the microwave-absorbing heat generator preferably has also a flat shape since heat is easily transferred in such a shape. A microwave-absorbing heat generator sheet having micropores or microgrooves may also be used. Specific examples of the microwave-absorbing heat generator for use in the invention include a susceptor manufactured by Graphic Packaging described in JP-B-5000716, which is incorporated herein by reference in its entirety and a susceptor manufactured by Toppan Printing Co., Ltd. described in JP-A-2008-62990, which is incorporated herein by reference in its entirety.

The batter of the present invention has a characteristic suitable for a noodle-strip food. Specifically, the batter is suitable for a noodle-strip food in which 5% or more of the surface area of the filling is covered with a noodle-strip with a thickness of 0.01 to 30 mm.

The batter of the present invention contains trehalose. The content of trehalose is from 0.5 to 25% by weight, preferably from 1 to 25% by weight, more preferably from 1.5 to 20% by weight, and still more preferably from 2 to 10% by weight, based on the weight of the batter. When the content of trehalose is within this range, an effect of making the texture of the batter applied on the heat-treated surface crisp can be obtained.

The batter contains, in addition to trehalose, water, a grain flour, and an emulsifier as essential raw materials. If necessary, the batter may further contain an oil or fat, a starch, a liquid seasoning, a powder seasoning, and the like. From the viewpoint of a high effect of imparting a freshly pan-fried flavor and aroma to a heat-treated surface of the noodle-strip food, the batter preferably contains a liquid seasoning or a powder seasoning. It is considered that dextrin, sodium phosphate, and/or a sucrose fatty acid ester and the like which is added to the batter may have an adverse effect on the texture, flavor and the like depending on the amount thereof. In the present invention, therefore, an embodiment where the batter does not combine therewith may be considered.

The water is not particularly limited, and, for example, tap water, distilled water, purified water, ultra-purified water, and industrial water can be used. The water content in the batter is from 15 to 65% by weight, and preferably from 20 to 60% by weight, based on the weight of batter.

As the grain flour, wheat flour, rice flour, corn flour, barley flour, buckwheat flour, potato flour, soy flour, Azuki bean flour, Japanese millet flour, millet flour, Proso millet flour, etc. can be used. From the viewpoint of a high effect of imparting a crisp texture and a freshly pan-fried flavor and aroma to a heat-treated surface of the noodle-strip food, wheat flour is especially preferred. The content of the grain flour in the batter is from 5 to 30% by weight, preferably from 8 to 28% by weight, and more preferably from 10 to 26% by weight, based on the weight of the batter.

Examples of the emulsifier include a lecithin (derived from soybean, egg, or sunflower), an enzyme-decomposed lecithin, a monoglyceride, a polyglyceryl fatty acid ester, and a propylene glycol fatty acid ester. From the viewpoint of a high effect of imparting a crisp texture and a freshly pan-fried flavor and aroma to a heat-treated surface of the noodle-strip food, a lecithin is especially preferred. The content of the emulsifier in the batter is from 1 to 4% by weight, preferably from 1.2 to 3.8% by weight, and more preferably from 1.5 to 3.5% by weight, based on the weight of the batter.

Any kind of oil or fat can be used as long as it is an edible oil. Examples thereof include rape seed oil, canola oil, soy bean oil, cone oil, safflower oil, peanut oil, lard, shortening, butter, and palm oil. From the viewpoint of a high effect of imparting a crisp texture and a freshly pan-fried flavor and aroma to a heat-treated surface of the noodle-strip food, rape seed oil is especially preferred. The content of the oil or fat in the batter is from 10 to 50% by weight, and preferably from 15 to 45% by weight, based on the weight of the batter.

As the starch, rice starch, wheat starch, potato starch, corn starch, tapioca starch, waxy starch, sago starch, etc. can be used. From the viewpoint of a high effect of imparting a crisp texture and a freshly pan-fried flavor and aroma to a heat-treated surface of the noodle-strip food, rice starch and corn starch are especially preferred. The content of the starch in the batter is from 5 to 30% by weight, and preferably from 10 to 25% by weight, based on the weight of the batter.

As the liquid seasoning, soy sauce, sake, mirin (sweet sake), vinegar, nam pla, various sauces, etc, can be used. From the viewpoint of a high effect of imparting a crisp texture and a freshly pan-fried flavor and aroma to a heat-treated surface of the noodle-strip food, soy sauce is preferably contained. The content of the liquid seasoning in the batter is from 1 to 30% by weight, preferably from 1.5 to 25% by weight, and more preferably from 2 to 20% by weight, based on the weight of the batter.

As the powder seasoning, powder soy source, a yeast extract, a protein hydrolysate, a meat extract, a seafood extract, a vegetable extract, sugar, salt, an amino acid seasoning such as monosodium glutamate (MSG), a nucleotide seasoning such as inosine monophosphate (IMP), a spice, etc. can be used. From the viewpoint of a high effect of imparting a crisp texture and a freshly pan-fried flavor and aroma to a heat-treated surface of the noodle-strip food, powder soy source is preferably contained. The content of the powder seasoning in the batter is from 0.5 to 20% by weight, preferably from 1 to 15% by weight, and more preferably from 1.5 to 10% by weight, based on the weight of the batter.

In the batter of the present invention, other components than the above may be contained unless it impairs the object of the invention. Examples of the other components include an organic acid such as citric acid, a fragrance, a dietary fiber, and a vitamin.

The batter of the present invention may be or may not be emulsified. A batter having a viscosity of from 0.07 to 8 Pa·s (pascal·second), preferably from 0.13 to 7 Pa·s, and more preferably from 0.2 to 6 Pa·s, as measured at 20° C. with a Brookfield viscometer using a rotor of No. 2, 61, 63, or 64 at a rotation speed of 0.3 to 100 rpm, can be used. As the Brookfield viscometer, a viscometer manufactured by Brookfield (model DV-I+) may be used.

The amount of the batter in the food for microwave oven cooking of the present invention is from 2 to 100% by weight, preferably from 4 to 80% by weight, and more preferably from 5 to 50% by weight, based on the weight of the noodle-strip food.

The state where the batter is interposed between the microwave-absorbing heat generator and the noodle-strip food may be any state where the batter is placed between the microwave-absorbing heat generator and the noodle-strip food. The food of the invention may have the batter between the microwave-absorbing heat generator and the noodle-strip food in a horizontal direction. For example, the microwave-absorbing heat generator may form an upper layer (the top surface), with the noodle-strip food forming a lower layer (the bottom surface), or conversely, the microwave-absorbing heat generator may form a lower layer (the bottom surface), with the noodle-strip food forming an upper surface (the top surface). The batter may also be placed between the microwave-absorbing heat generator and the noodle-strip food in a vertical direction.

In the food of the present invention, from the viewpoint of a high effect of imparting a crisp texture and a freshly pan-fried flavor and aroma to a heat-treated surface upon heating with a microwave oven, when the noodle-strip food is a gyoza dumpling, the gyoza dumpling is preferably subjected to the following process. That is, the gyoza dumpling is placed so that the batter is in contact with the bottom surface of the gyoza dumpling, the gyoza dumpling and the batter are steam-heated and quickly frozen at −30° C. or lower, and the obtained frozen gyoza dumpling with the batter is superimposed on the microwave-absorbing heat generator. Incidentally, the bottom surface of the gyoza dumpling means a portion of the gyoza dumpling that comes into contact with a frying pan or the like when the gyoza dumpling is heat-cooked with the frying pan or the like, and is generally referred to as a surface to be baked or a baked surface.

The state of the food for microwave oven cooking of the invention is not particularly limited and a normal temperature product, a refrigerated product, a chilled product, a frozen product, etc. may be exemplified, but a frozen product which can be stored for a long period of time is especially preferred. The frozen product refers to a product to be stored in a frozen state at −5° C. or lower. The storage temperature of the frozen product is, from the viewpoint of preventing quality degradation, −45° C. to −5° C., and preferably −30° C. to −18° C.

Method for manufacturing a food for microwave oven cooking of the invention.

The present invention provides a method for manufacturing a food for microwave oven cooking (hereinafter, also referred to as the manufacturing method of the present invention). The manufacturing method of the present invention comprises a step of putting a batter containing trehalose between a microwave-absorbing heat generator and a noodle-strip food. By putting the batter between the microwave-absorbing heat generator and the noodle-strip food, it is possible to impart a crisp texture and a freshly pan-fried flavor and aroma to a heat-treated surface of the noodle-strip food.

The manufacturing method of the present invention comprises a step of providing the microwave-absorbing heat generator, the noodle-strip food, and the batter containing trehalose.

As the microwave-absorbing heat generator and the noodle-strip food for use in the manufacturing method of the present invention, the heat generators and the foods listed in the food of the present invention mentioned above may be exemplified.

As the batter for use in the manufacturing method of the present invention, the batters listed in the food of the present invention mentioned above may be exemplified.

The method for preparing the batter may be a method in which a required amount of each of raw materials of the batter, i.e., trehalose, water, a grain flour, and an emulsifier, and if required, an oil or fat and a starch, are measured and mixed with a mixer or the like. The order of the addition of the raw materials is not particularly limited, but it is preferred that water, a grain flour, and trehalose are mixed to make a dispersion, the emulsifier is dispersed therein, and then the oil or fat is added thereto. The batter after mixing may be or may not be in an emulsion state.

As for the timing when the batter is provided, from the viewpoint that the grain flour sufficiently absorbs water to give a uniform state, the batter is preferably prepared at least one hour before the step of putting the batter between the microwave-absorbing heat generator and the noodle-strip food, and more preferably two hours before the step.

The manufacturing method of the present invention comprises a step of putting the batter containing trehalose between the microwave-absorbing heat generator and the noodle-strip food provided above. As a method for putting the batter between the microwave-absorbing heat generator and the noodle-strip food, a method is exemplified in which the noodle-strip food is placed on the batter, and then the microwave-absorbing heat generator is placed so as to be in contact with the surface to be baked (the batter layer side) of the noodle-strip food. The batter may be or may not be heated before or after the noodle-strip food is placed thereon. The amount of the batter to be put between the microwave-absorbing heat generator and the noodle-strip food is from 2 to 100% by weight, preferably from 4 to 80% by weight, and more preferably from 5 to 50% by weight, based on the weight of the noodle-strip food.

The manufacturing method of the present invention may further comprise a step of freezing after the above steps. As a method for the freezing, a method known per se may be used, but from the viewpoint of keeping quality, a quick-freezing is preferred. The temperature for the quick-freezing is −30° C. or lower, and preferably −35° C. or lower.

Other features of the invention will become apparent in the course of the following descriptions of exemplary embodiments which are given for illustration of the invention and are not intended to be limiting thereof.

EXAMPLES

Examples 1 and 2 and Comparative Examples 1-10

Batters were prepared using the ingredients shown in Tables 1 and 2.

TABLE 1

| Batter formulation | Example 1 | Comparative Example | | | | |
|---|---|---|---|---|---|---|
| | | 1 | 2 | 3 | 4 | 5 |
| Corn flour | 25 | 26 | 25 | 25 | 25 | 25 |
| Casein sodium | 0.8 | 0.8 | 0.8 | 0.8 | 0.8 | 0.8 |
| Trehalose | 2.5 | | | | | |
| Maltitol | | | 2.5 | | | |
| Xylitol | | | | 2.5 | | |
| Sorbitol | | | | | 2.5 | |
| Dextrin | | | | | | 2.5 |
| Rape seed oil | 31.8 | 31.8 | 31.8 | 31.8 | 31.8 | 31.8 |
| Lecithin | 1.9 | 1.9 | 1.9 | 1.9 | 1.9 | 1.9 |
| Soy source | 8 | 8 | 8 | 8 | 8 | 8 |
| Water | 30 | 31.5 | 30 | 30 | 30 | 30 |
| Total | 100 | 100 | 100 | 100 | 100 | 100 |
| Texture | A | D | C | D | D | D |
| Flavor | B | B | C | C | C | B |

TABLE 2

| Batter formulation | Example 2 | Comparative Example | | | | |
|---|---|---|---|---|---|---|
| | | 6 | 7 | 8 | 9 | 10 |
| Corn flour | 25 | 25 | 25 | 25 | 25 | 25 |
| Casein sodium | 0.8 | 0.8 | 0.8 | 0.8 | 0.8 | 0.8 |
| Trehalose | 25 | | | | | |
| Maltitol | | | 25 | | | |
| Xylitol | | | | 25 | | |
| Sorbitol | | | | | 25 | |
| Dextrin | | | | | | 25 |
| Rape seed oil | 22.5 | 31.8 | 22.5 | 22.5 | 22.5 | 22.5 |
| Lecithin | 1.7 | 1.9 | 1.7 | 1.7 | 1.7 | 1.7 |
| Soy source | 4 | 8 | 4 | 4 | 4 | 4 |
| Water | 21 | 32.5 | 21 | 21 | 21 | 21 |
| Total | 100 | 100 | 100 | 100 | 100 | 100 |
| Texture | A | D | C | D | D | D |
| Flavor | B | B | D | D | D | B |

According to the formulations shown in Table 1 and Table 2, each batter was prepared. After 2.5 g of the batter was charged in a container or a tray which could contain a gyoza dumpling, a shaped raw gyoza dumpling was placed thereon so that a bottom surface of the gyoza dumpling was in contact with the batter. The gyoza dumpling with the batter in the container or tray was then steamed at about 98° C. for 12 minutes, and quickly frozen at −35° C. The frozen gyoza dumpling was then stored at −18° C. for 24 hours. After that, a microwave-absorbing heat generator (Graphic Packaging) was superimposed on a surface to be baked with the batter applied thereon (the batter layer side), of the gyoza dumpling. A cooking with a microwave oven (General Electric Co.) was applied at a 1300-W setting for 2.5 minutes, followed by a sensory test.

The sensory test was conducted for the crisp texture and the freshly pan-fried flavor and aroma of the heat-treated surface by five trained raters according to the following criteria:
D: Very poor
C: Poor
B: Good
A: Very good It was found from the results shown in Table 1 and Table 2 that the gyoza dumplings of the examples using a batter containing trehalose were superior in the texture of the baked surface immediately after the microwave oven cooking as compared with Comparative Examples 1 to 10 where a sugar alcohol such as maltitol, xylitol, and sorbitol or a polysaccharide such as dextrin was used in place of trehalose. It was also found that when a sugar alcohol was used in the batter in a concentration as shown in the examples, the flavor was impaired since the batter portion after the microwave oven cooking had a sweetness which is not preferable for a gyoza dumpling.

Examples 3-7

Batters were prepared using the ingredients shown in Table 3.

TABLE 3

| Batter formulation | Example | | | | |
|---|---|---|---|---|---|
|  | 3 | 4 | 5 | 6 | 7 |
| Corn flour | 13 | 12.3 | 9.9 | 8.2 | 13.5 |
| Whole wheat flour | 13 | 12.3 | 9.9 | 8.2 | 13.5 |
| Casein sodium | 0.9 | 0.8 | 0.7 | 0.5 | 0.9 |
| Trehalose | 8.7 | 8.2 | 6.6 | 5.4 | 9.0 |
| Rape seed oil | 33 | 31 | 25 | 20.7 | 34.0 |
| Lecithin | 2.1 | 2 | 1.6 | 1.4 | 2.2 |
| Soy source | 4.3 | 4 | 3.3 | 2.7 | 4.4 |
| water | 25 | 29.4 | 43 | 52.9 | 22.6 |
| Total | 100 | 100 | 100 | 100 | 100 |
| Viscosity (Pa · s) | 8 | 4.5 | 0.07 | 0.02 | 12 |
| Texture | 4 | 4 | 4 | — | 2 |
| Flavor | 3 | 3 | 3 | — | 3 |

According to the formulations shown in Table 3, each batter was prepared. After 2.0 g of the batter was charged in a tray, a shaped raw shaomai was placed thereon so that a bottom surface of the shaomai was in contact with the batter. The shaomai was then steamed at about 98° C. for 12 minutes, and quickly frozen at −35° C. The frozen shaomai was then stored at −18° C. for 24 hours. After that, a microwave-absorbing heat generator (Graphic Packaging) was superimposed on the surface to be baked (the batter layer side) with the batter applied thereon, of the shaomai. A cooking with a microwave oven (General Electric Co.) was applied at a 1300-W setting for 2.5 minutes, followed by a sensory test.

The viscosity was measured at 20° C. with a Brookfield viscometer (Brookfield, model LVDVI+) using a rotor of No. 2, 61, 63, or 64 at a rotation speed of from 0.3 to 100 rpm. The unit of the viscosity is Pa·s.

The sensory test was conducted for the crisp texture and a freshly pan-fried flavor and aroma of a heat-treated surface by five trained raters under the following criteria, with the rate for Example 6 taken as the level 2.
1: Worse than Example 6
2: Comparable with Example 6
3: More preferable than Example 6
4: Much more preferable than Example 6

It was found from the results presented in Table 3 that shaomais of the examples using a batter having a viscosity of 0.07 to 8 Pa·s had a very good texture of the baked surface after the microwave oven cooking.

Examples 8-12

Batters were prepared using the ingredients shown in Table 4.

TABLE 4

| Batter formulation | Example | | | | |
|---|---|---|---|---|---|
|  | 8 | 9 | 10 | 11 | 12 |
| Corn flour | 12.3 | 11.1 | 10.8 | 11.2 | 10.5 |
| Whole wheat flour | 12.3 | 11.1 | 10.8 | 11.2 | 10.5 |
| Casein sodium | 0.8 | 0.7 | 0.7 | 0.7 | 0.7 |
| Trehalose | 8.2 | 7.4 | 7.2 | 7.5 | 7 |
| Rape seed oil | 31 | 28 | 27 | 28.2 | 26.6 |
| Lecithin | 2 | 1 | 4 | 0 | 6 |
| Soy source | 4 | 3.5 | 3.5 | 3.7 | 3.4 |
| water | 29.4 | 37.2 | 36 | 37.5 | 35.3 |
| Total | 100 | 100 | 100 | 100 | 100 |
| Viscosity (Pa · s) | 4.5 | 0.08 | 0.13 | 0.07 | 0.36 |
| Texture | 4 | 4 | 4 | — | 2 |
| Flavor | 3 | 3 | 3 | — | 1 |
| Detachability from tray | 3 | 3 | 3 | — | 3 |

According to the formulation shown in Table 4, each batter was prepared. After 2.0 g of the batter was charged in a tray, a shaped raw shaomai was placed thereon so that a bottom surface of the shaomai was in contact with the batter. The shaomai was then steamed at about 98° C. for 12 minutes, and quickly frozen at −35° C. The frozen shaomai was then stored at −18° C. for 24 hours. After that, the microwave-absorbing heat generator (Graphic Packaging) was superimposed on the surface to be baked (the batter layer side) with the batter applied thereon, of the shaomai. A cooking with a microwave oven (General Electric Co.) was applied thereto at a 1300-W setting for 2.5 seconds, followed by a sensory test.

The sensory test was performed for the crisp texture and a freshly pan-fried flavor and aroma of a heat-treated surface by five trained raters under the following criteria, with the rate for Example 11 taken as the level 2.
1: Worse than Example 11
2: Comparable with Example 11
3: More preferable than Example 11
4: Much more preferable than Example 11

It was found from the results shown in Table 4 that a shaomai using a batter containing lecithin in an amount of from 1 to 4% by weight of the batter had a very good texture of the baked surface after the microwave oven cooking and the detachability of the shaomai from the tray after the cooking was also good.

ADVANTAGEOUS EFFECTS OF THE INVENTION

According to the present invention, it is possible to obtain a noodle-strip food having a heat-treated surface with a crisp texture and having a good flavor by means of a microwave oven cooking, and an advantageous effect such as capability of a cooking in a shorter period of time as compared with the case of re-heating with a frying pan or the like can be accepted.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A microwavable frozen food, comprising:
   (A) a microwave-absorbing heat generator;
   (B) a noodle-strip food; and
   (C) a frozen batter interposed between said microwave-absorbing heat generator and said noodle-strip food,
   wherein said frozen batter contains trehalose in an amount of 0.5% by weight to 8.7% by weight and water in an amount of 15% by weight to 65% by weight, based on the weight of said frozen batter,
   wherein said frozen batter is formed by freezing a batter which is not baked or fried, and
   wherein said frozen batter is included in said food in an amount of 2% by weight to 50% by weight based on the weight of said noodle-strip food.

2. The food according to claim 1, wherein said trehalose is present in said frozen batter in an amount of 0.5% by weight to 8.2% by weight, based on the weight of said frozen batter.

3. The food according to claim 1, wherein said frozen batter is formed by freezing the batter having a viscosity of 0.07 Pa·s to 8 Pa·s.

4. The food according to claim 3, wherein said batter comprises a grain flour in an amount of 5% by weight to 30% by weight, based on the weight of said batter, and an emulsifier.

5. The food according to claim 1, wherein said frozen batter contains said water in an amount of 20% by weight to 60% by weight, based on the weight of said frozen batter.

6. The food according to claim 1, wherein said noodle-strip food comprises a dough and a filling packed or wrapped in the dough.

7. The food according to claim 1, wherein said noodle-strip food is one or more kinds selected from the group consisting of a gyoza dumpling, a shaomai, an egg roll, a ravioli, a Chinese steamed bun, a pie, a pierogi, a burrito, a taco, and a taquito.

8. The food according to claim 1, wherein said noodle-strip food is a gyoza dumpling.

9. The food according to claim 1, wherein said trehalose is present in said frozen batter in an amount of 2% by weight to 8.7% by weight, based on the weight of said frozen batter.

10. The food according to claim 4, wherein said emulsifier is present in said frozen batter in an amount of 1% by weight to 4% by weight, based on the weight of said frozen batter, and comprises lecithin.

11. A method for manufacturing a frozen food for microwave oven cooking, comprising:
   ROM interposing a batter between a microwave-absorbing heat generator and a noodle-strip food; and
   freezing said microwave-absorbing heat generator, said noodle-strip food, and said batter,
   wherein said batter contains trehalose in an amount of 0.5% by weight to 8.7% by weight and water in an amount of 15% by weight to 65% by weight, based on the weight of said batter,
   wherein said batter is not baked or fried, and
   wherein an amount of said batter is 2% by weight to 50% by weight based on the weight of said noodle-strip food.

12. The method according to claim 11, wherein said trehalose is present in said batter in an amount of 0.5% by weight to 8.2% by weight, based on the weight of said batter.

13. The method according to claim 11, wherein said batter has a viscosity of 0.07 Pa·s to 8 Pa·s.

14. The method according to claim 13, wherein said batter comprises a grain flour in an amount of 5% by weight to 30% by weight, based on the weight of said batter, and an emulsifier.

15. The method according to claim 14, wherein said emulsifier is present in said batter in an amount of 1% by weight to 4% by weight, based on the weight of said batter, and comprises lecithin.

16. A microwavable frozen food, comprising:
   (B) a gyoza dumpling; and
   (C) a frozen batter,
   wherein said frozen batter comprises trehalose, water, a grain flour, and an emulsifier,
   wherein said trehalose is present in an amount of 0.5% by weight to 8.7% by weight and said water is present in an amount of 15% by weight to 65% by weight, based on the weight of said frozen batter,
   wherein said frozen batter is formed by freezing a batter which is not baked or fried,
   wherein said frozen batter is included in said food in an amount of 2% by weight to 50% by weight based on the weight of said gyoza dumpling, and
   wherein said frozen batter is in contact with a surface of said gyoza dumpling.

17. The food according to claim 16, wherein said frozen batter is formed by freezing the batter having a viscosity of 0.07 Pa·s to 8 Pa·s.

18. The food according to claim 16, wherein said frozen batter comprises said grain flour in an amount of 5% by weight to 30% by weight, based on the weight of said frozen batter, and an emulsifier.

19. The food according to claim 17, wherein said frozen batter comprises said grain flour in an amount of 5% by weight to 30% by weight, based on the weight of said frozen batter, and an emulsifier.

20. A method for manufacturing a frozen food for microwave oven cooking, comprising:
   attaching a batter to a noodle-strip food;
   freezing the noodle-strip food to which said batter is attached; and
   superimposing the frozen noodle-strip food on a microwave-absorbing heat generator such that the frozen batter attached to the frozen noodle-strip food contacts the microwave-absorbing heat generator,
   wherein said batter contains trehalose in an amount of 0.5% by weight to 8.7% by weight and water in an amount of 15% by weight to 65% by weight, based on the weight of said batter,
   wherein said batter is not baked or fried, and wherein an amount of said batter attached to said noodle-strip food is 2% by weight to 50% by weight based on the weight of said noodle-strip food.

* * * * *

UNITED STATES PATENT AND TRADEMARK OFFICE
CERTIFICATE OF CORRECTION

Page 1 of 1

PATENT NO. : 9,974,324 B2
APPLICATION NO. : 15/052050
DATED : May 22, 2018
INVENTOR(S) : Kazuya Hori et al.

It is certified that error appears in the above-identified patent and that said Letters Patent is hereby corrected as shown below:

On the Title Page

Items (71) and (73), the information for the Applicant and the Assignee is incorrect. Items (71) and (73) should read:

--(71) Applicant: AJINOMOTO WINDSOR, INC., Ontario, CA (US)--

--(73) Assignee: AJINOMOTO WINDSOR, INC., Ontario, CA (US)--

Signed and Sealed this
Twenty-third Day of April, 2019

Andrei Iancu
*Director of the United States Patent and Trademark Office*